United States Patent
Liu et al.

(10) Patent No.: US 11,847,826 B2
(45) Date of Patent: Dec. 19, 2023

(54) SYSTEM AND METHOD FOR PROVIDING DOMINANT SCENE CLASSIFICATION BY SEMANTIC SEGMENTATION

(71) Applicant: Samsung Electronics Co., Ltd., Suwon-si (KR)

(72) Inventors: Qingfeng Liu, San Diego, CA (US); Mostafa El-Khamy, San Diego, CA (US); Rama Mythili Vadali, San Diego, CA (US); Tae-ui Kim, Hwaseong-si (KR); Andrea Kang, San Diego, CA (US); Dongwoon Bai, San Diego, CA (US); Jungwon Lee, San Diego, CA (US); Maiyuran Wijay, San Diego, CA (US); Jaewon Yoo, Yongin-si (KR)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/083,081

(22) Filed: Dec. 16, 2022

(65) Prior Publication Data
US 2023/0123254 A1 Apr. 20, 2023

Related U.S. Application Data

(63) Continuation of application No. 17/177,720, filed on Feb. 17, 2021, now Pat. No. 11,532,154, which is a
(Continued)

(51) Int. Cl.
*G06T 7/00* (2017.01)
*G06V 20/00* (2022.01)
(Continued)

(52) U.S. Cl.
CPC .............. *G06V 20/35* (2022.01); *G06F 18/24* (2023.01); *G06V 10/26* (2022.01); *G06V 10/50* (2022.01);
(Continued)

(58) Field of Classification Search
CPC ...... G06V 10/82; G06V 10/764; G06V 10/26; G06V 20/10; G06V 20/35; G06V 10/454;
(Continued)

(56) References Cited

U.S. PATENT DOCUMENTS 6,724,933 B1 4/2004 Lin et al.
9,916,522 B2 3/2018 Ros Sanchez et al.
(Continued)

FOREIGN PATENT DOCUMENTS

CN 107369204 A 11/2017
CN 108345887 A 7/2018
(Continued)

OTHER PUBLICATIONS

Mark Sandler, et al., "MobileNetV2: Inverted Residuals and Linear Bottlenecks", 2018 IEEE/CVF Conference on Computer Vision and Pattern Recognition, Salt Lake City, UT, pp. 4510-4520; doi 10.1109/CVPR.2018.00474.
(Continued)

*Primary Examiner* — Quan M Hua
(74) *Attorney, Agent, or Firm* — Lewis Roca Rothgerber Christie LLP

(57) ABSTRACT

A method for computing a dominant class of a scene includes: receiving an input image of a scene; generating a segmentation map of the input image, the segmentation map being labeled with a plurality of corresponding classes of a plurality of classes; computing a plurality of area ratios based on the segmentation map, each of the area ratios corresponding to a different class of the plurality of classes
(Continued)

of the segmentation map; and outputting a detected dominant class of the scene based on a plurality of ranked labels based on the area ratios.

22 Claims, 12 Drawing Sheets

Related U.S. Application Data continuation of application No. 16/452,052, filed on Jun. 25, 2019, now Pat. No. 10,929,665.

(60) Provisional application No. 62/784,320, filed on Dec. 21, 2018.

(51) Int. Cl.
| | |
|---|---|
| *G06V 20/10* | (2022.01) |
| *G06F 18/24* | (2023.01) |
| *H04N 23/61* | (2023.01) |
| *H04N 23/667* | (2023.01) |
| *G06V 10/764* | (2022.01) |
| *G06V 10/82* | (2022.01) |
| *G06V 10/26* | (2022.01) |
| *G06V 10/50* | (2022.01) |

(52) U.S. Cl.
CPC .......... *G06V 10/764* (2022.01); *G06V 10/82* (2022.01); *G06V 20/10* (2022.01); *H04N 23/61* (2023.01); *H04N 23/667* (2023.01)

(58) Field of Classification Search
CPC .... G06V 10/147; G06V 10/60; G06V 10/774; G06V 10/267; G06V 20/70; G06V 10/7625; G06V 10/776; G06V 10/52; G06V 20/182; G06N 3/045; G06N 3/084; G06N 3/08; G06N 20/00; G06N 3/04; G06N 3/047; G06N 3/088; G06N 7/01; G06T 7/11; G06T 2207/20084; G06T 2207/20081; G06T 7/174; G06T 2207/20016; G06T 2207/20104; G06T 17/00; G06T 2207/10028; G06T 2207/10088
See application file for complete search history.

(56) References Cited

U.S. PATENT DOCUMENTS

| | | |
|---|---|---|
| 10,706,334 B2 | 7/2020 | Pan et al. |
| 10,929,665 B2 | 2/2021 | Liu et al. |
| 2012/0089552 A1 | 4/2012 | Chang et al. |
| 2016/0207458 A1* | 7/2016 | Pillai ...................... G06V 20/56 |
| 2017/0278402 A1 | 9/2017 | Yalla et al. |
| 2017/0300737 A1 | 10/2017 | Wang |
| 2017/0337271 A1 | 11/2017 | Lee et al. |
| 2018/0108138 A1 | 4/2018 | Kluckner et al. |
| 2018/0115706 A1 | 4/2018 | Kang et al. |
| 2018/0253622 A1 | 9/2018 | Chen et al. |
| 2019/0005356 A1 | 1/2019 | Tsunoda et al. |
| 2019/0228529 A1* | 7/2019 | Sun ......................... G06T 7/143 |
| 2020/0082541 A1* | 3/2020 | Jouppi .................... G06T 5/002 |
| 2020/0167930 A1* | 5/2020 | Wang ...................... G06N 3/08 |

FOREIGN PATENT DOCUMENTS

| | | |
|---|---|---|
| CN | 108734713 A | 11/2018 |
| EP | 3171297 A1 | 5/2017 |
| TW | 201832137 A | 9/2018 |
| WO | WO 2018171899 A1 | 9/2018 |
| WO | WO 2018217828 A1 | 11/2018 |

OTHER PUBLICATIONS

Benjamin Laugraud et al., "LaBGen-P-Semantic: A First Step for Leveraging Semantic Segmentation in Background Generation", Journal of Imaging; Basel vol. 4, Issue 7, (Jul. 2018), DOI: 10.3390/jimaging4070086.

Xin-Yu Ou et al., "Objectness Region Enhancement Networks for Scene Parsing", Journal of Computer Science and Technology, Version 32, (4), 683-700, Jul. 2017; ISSN: 1000-9000; DOI: 10.1007/s11390-017-1751-x.

Chen, Liang-Chieh, et al. "Encoder-decoder with atrous separable convolution for semantic image segmentation." *Proceedings of the European conference on computer vision* (ECCV). 2018.

Taiwanese Notice of Allowance for TW Patent Application No. 108141924 dated Mar. 3, 2023, 4 pages.

* cited by examiner

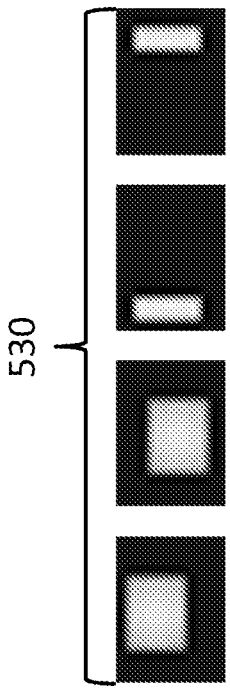
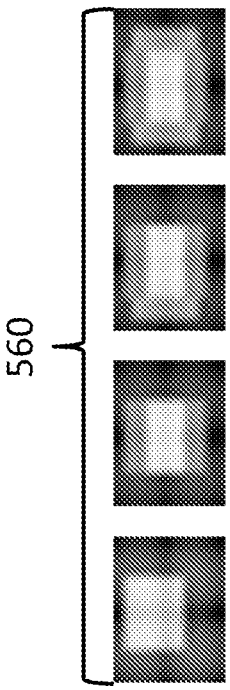
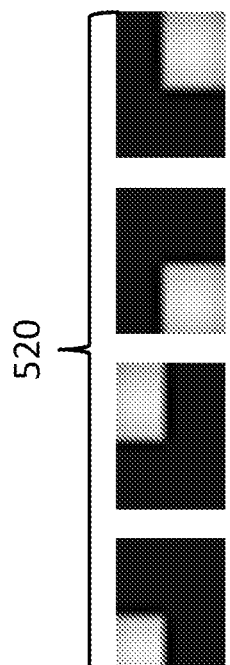
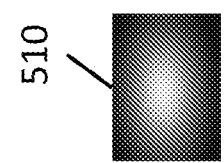
FIG. 5A
FIG. 5B
FIG. 5C

FIG. 5D

SYSTEM AND METHOD FOR PROVIDING DOMINANT SCENE CLASSIFICATION BY SEMANTIC SEGMENTATION

CROSS-REFERENCE TO RELATED APPLICATION(S)

This application is a continuation of U.S. patent application Ser. No. 17/177,720, filed Feb. 17, 2021, which is a continuation of U.S. patent application Ser. No. 16/452,052 filed Jun. 25, 2019, now U.S. Pat. No. 10,929,665, which claims priority to and the benefit of U.S. Provisional Patent Application No. 62/784,320, filed in the United States Patent and Trademark Office on Dec. 21, 2018, the entire disclosures of each of which are incorporated by reference herein.

FIELD

Aspects of embodiments of the present disclosure relate to the field of computer vision, including specifically a system and method for providing dominant scene classification by semantic segmentation.

BACKGROUND

Scene classification refers to the process of perceiving a natural scene and understanding the content of the scene. A human may perceive a scene with their eyes and identify salient aspects of the scene (e.g., people in front of a landmark or a tourist attraction). In the context of computer vision, scene classification may include capturing one or more images of a scene using a camera and identifying the elements of the scene. Semantic segmentation refers to the process of identifying portions or regions of the images that correspond to particular classes of objects (e.g., people, buildings, and trees).

SUMMARY

Aspects of embodiments of the present disclosure relate to performing dominant scene classification of images of scenes. Dominant scene classification includes identifying the subject or subjects of a scene. Some aspects of embodiments of the present disclosure utilize semantic segmentation to perform the dominant scene classification.

According to one embodiment, a method for computing a dominant class of a scene includes: receiving an input image of a scene; generating a segmentation map of the input image, the segmentation map being labeled with a plurality of corresponding classes of a plurality of classes; computing a plurality of area ratios based on the segmentation map, each of the area ratios corresponding to a different class of the plurality of classes of the segmentation map; and outputting a detected dominant class of the scene based on the plurality of ranked labels based on the area ratios.

The method may further include determining the detected dominant class based on a highest ranked label of the plurality of area ratios.

The method may further include using an atrous spatial pyramid pooling module to receive an output of a plurality of atrous convolutional layers, and the segmentation map may be computed based on an output of the atrous spatial pyramid pooling module.

The computing the area ratios may include: spatially weighting the segmentation map by multiplying each location of the segmentation map by a corresponding one of a plurality of spatial importance weights; and summing the spatially weighted segmentation map to compute a spatially weighted area ratio for each of the classes, wherein the spatial importance weights are a weighted combination of Gaussian filters having highest weight in a region corresponding to a middle third of the input image.

The computing the area ratios may further include class weighting the area ratios by multiplying the area ratio for each class by a corresponding class importance weight of a plurality of class importance weights, and wherein the plurality of class importance weights may include a foreground group of classes having higher weights than a background group of classes.

The foreground group of classes may include a text class and a person class, and the background group of classes may include a sky class and a tree class.

The method may further include: receiving a sequence of input images before the input image; computing a softmax over each pixel of each image of the sequence of input images; performing temporal filtering over each pixel across each image of the sequence of input images to compute a filtered softmax volume; and computing a maximum across the filtered softmax volume to compute the segmentation map.

The temporal filtering may be performed with a triple-exponential smoothing filter.

The method may further include: generating a sequence of weighted area ratios for a sequence of segmentation maps computed from the sequence of input images; and performing temporal filtering over the sequence of weighted area ratios, wherein the plurality of ranked labels is computed based on the sequence of weighted area ratios.

The detected dominant class may be selected by: evaluating a hysteresis condition that is met when a previously detected dominant class is a second highest ranked label of the plurality of ranked labels and when a difference in weighted area ratio between a highest ranked label and the second highest ranked label is less than a threshold; in response to determining that the hysteresis condition is met, maintaining the previously detected dominant class as the dominant class; and in response to determining that the hysteresis condition is not met, setting the highest ranked label as the detected dominant class.

Each pixel of the segmentation map may be associated with one or more corresponding confidence values, each of the one or more corresponding confidence values corresponding to a different one of the plurality of classes, and the method may further include thresholding the segmentation map by selecting values from locations of the segmentation map where corresponding locations of the confidence map exceed a threshold corresponding to a class of the location of the segmentation map.

The segmentation map may be computed from a plurality of logits output by a convolutional neural network, the logits including spatial dimensions and a feature dimension, and the one or more confidence values form a confidence map may be generated by: computing a softmax along the feature dimension of the logits; and computing a maximum of the softmax along the feature dimension of the logits to compute the confidence values corresponding to each location of the confidence map.

The segmentation map may be generated by a convolutional neural network wherein the convolutional neural network may include a global classification head configured to compute a global classification of a class of the input image, and the convolutional neural network may be trained with a loss function including a weighted sum of: a first loss associated with the detected dominant class; and a second loss associated with the global classification computed by the global classification head.

The global classification head may be configured to receive input from an output of the convolutional neural network.

The method may further include using an atrous spatial pyramid pooling module configured to receive an output of a plurality of atrous convolutional layers, wherein the segmentation map may be computed based on an output of the atrous spatial pyramid pooling module, and wherein the global classification head may be configured to receive input from the output of the atrous spatial pyramid pooling module.

The segmentation map may be generated by a convolutional neural network trained to recognize a text class of the plurality of classes with training data including images of text and corresponding labels, and the corresponding labels may include bounding boxes surrounding text.

A class of the plurality of classes may include a plurality of subclasses, and the method may further include assigning a subclass to a region in the segmentation map corresponding to the class by: detecting a color of each of a plurality of pixels of the input image in the region corresponding to the class; assigning one of the plurality of subclasses to each of the pixels based on the color of the pixel; and assigning the subclass to the region based on majority voting among the subclasses assigned to the pixels of the region.

The class may be water and the subclasses may include: low saturation water; green water; blue water; and other water.

The method may further include: identifying a portion of the input image of the scene corresponding to the detected dominant class; and configuring camera settings of a digital camera module in accordance with the identified portion of the input image of the scene.

The digital camera module may be a component of a mobile device.

According to one embodiment, a system includes: a processor; and memory storing instructions that, when executed by the processor, cause the processor to compute a dominant class of a scene by: receiving an input image of a scene; generating a segmentation map of the input image, the segmentation map being labeled with a corresponding class of a plurality of classes; computing a plurality of area ratios based on the segmentation map, each of the area ratios corresponding to a different class of the plurality of classes of the segmentation map; and outputting a detected dominant class of the scene based on the plurality of ranked labels.

The memory may further store instructions for computing the area ratios by: spatially weighting the segmentation map by multiplying each location of the segmentation map by a corresponding one of a plurality of spatial importance weights; and summing the spatially weighted segmentation map to compute a spatially weighted area ratio for each of the classes, wherein the spatial importance weights may be a weighted combination of Gaussian filters having highest weight in a region corresponding to a middle third of the input image.

The memory may further store instructions for computing the area ratios by class weighting the area ratios by multiplying the area ratio for each class by a corresponding class importance weight of a plurality of class importance weights, and wherein the plurality of class importance weights may include a foreground group of classes having higher weights than a background group of classes.

The foreground group of classes may include a text class and a person class, and the background group of classes may include a sky class and a tree class.

Each pixel of the segmentation map may be associated with one or more corresponding confidence values, each of the one or more corresponding confidence values corresponding to a different one of the plurality of classes, and wherein the memory may further store instructions for thresholding the segmentation map by selecting values from locations of the segmentation map where corresponding locations of the confidence map exceed a threshold corresponding to a class of the location of the segmentation map.

The system may further include a digital camera module, wherein the memory further stores instructions that, when executed by the processor, cause the processor to: identify a portion of the input image of the scene corresponding to the detected dominant class; and configure camera settings of the digital camera module in accordance with the identified portion of the input image of the scene.

BRIEF DESCRIPTION OF THE DRAWINGS

The accompanying drawings, together with the specification, illustrate exemplary embodiments of the present disclosure, and, together with the description, serve to explain the principles of the present disclosure.

FIG. 5A illustrates a central Gaussian filter, quadrant filters, and sideways filters according to one embodiment.

FIG. 5B illustrates weighted combinations of the individual filters shown in FIG. 5A according to one embodiment.

FIG. 5C illustrates a resulting spatial filter from combining the filters shown in FIGS. 5A and 5B according to one embodiment.

FIG. 5D is a depiction of a spatial filter weight for a 20×15 spatial filter according to one embodiment.

DETAILED DESCRIPTION

In the following detailed description, only certain exemplary embodiments of the present disclosure are shown and described, by way of illustration. As those skilled in the art would recognize, the disclosure may be embodied in many different forms and should not be construed as being limited to the embodiments set forth herein.

Aspects of embodiments of the present disclosure relate to performing dominant scene classification of images of scenes. Dominant scene classification includes identifying the subject or subjects of a scene. Some aspects of embodiments of the present disclosure utilize semantic segmentation to perform the dominant scene classification. For example, some aspects of embodiments of the present disclosure relate to assigning importance weights to objects detected in a scene, where the importance weights may be calculated based on the class of the object (e.g., classifying the object as a person, a dog, a cat, a tree, a waterfall, and the like), a location of the object within the image, and an area ratio of the object in the image.

Figure 1:
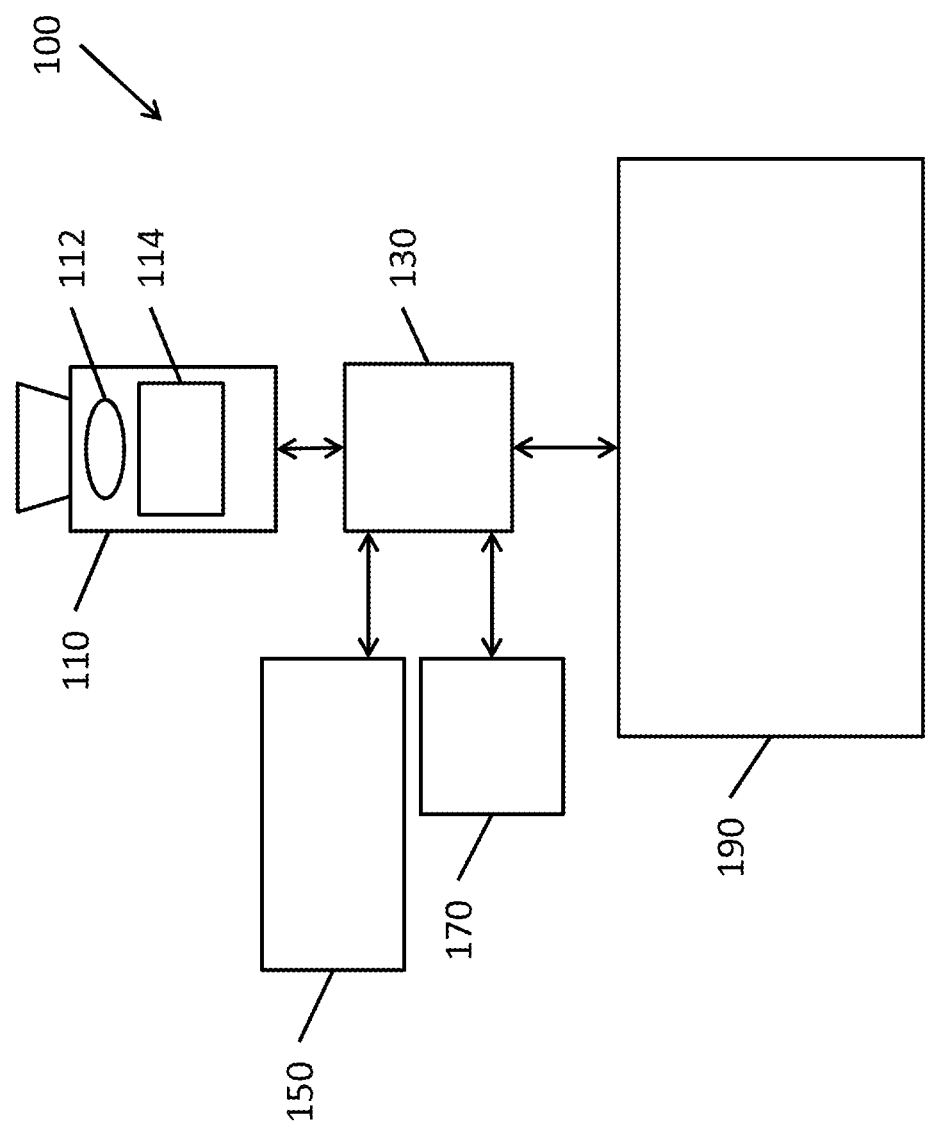
FIG. 1 is a block diagram of an example of a digital camera system, according to one embodiment.

Some applications of embodiments of the present disclosure relate to use with, for example, a standalone digital camera or a digital camera integrated into a smartphone. FIG. 1 is a block diagram of an example of a digital camera system 100 in accordance with some embodiments of the present disclosure, which may be components of, for example, a standalone digital camera or a smartphone. For the sake of clarity, a digital camera system 100 generally includes a digital camera module 110 including a lens 112 mounted in front of an image sensor 114 (e.g., a complementary metal oxide semiconductor (CMOS) image sensor). The digital camera system 100 may further include a processor (or an image signal processor (ISP)) 130 configured to receive data captured by the digital camera module 110 (e.g., image data of a scene), and may store the received data in memory 150. The memory 150 may include dynamic memory (DRAM) and/or persistent memory (e.g., flash memory). In some circumstances, the image signal processor 116 is integrated into the processor 130. In some embodiments, the digital camera system 100 further includes a co-processor 170 such as a field programmable gate array (FPGA), a graphical processing unit (GPU), a vector processor, or a neural processing unit. In some embodiments, the co-processor is integrated with the processor 130 (e.g., on the same die).

When operating a digital camera, in many circumstances, the digital camera module 110 continually captures images of the scene. For example, the digital camera system 100 may show the continually captured images on the display device 190 to provide a user (e.g., a photographer) with a real-time preview of the view through the lens based on current capture settings, such as focus, aperture, shutter speed, sensor gain (e.g., ISO), white balance, and the like. In some circumstances, a user may alter the capture settings using controls of the digital camera system, which may include physical buttons and dials on the camera or soft controls (e.g., controls shown on a display device 190 that is touch sensitive). As one example, the user may adjust the focus of the camera by touching a part of the display showing a part of an object of the scene that the user wants the camera to focus on. Generally, the user can also trigger the recording of, for example, a single image, a burst of images, or a video by activating a "shutter release" or "record" control (e.g., a hardware button or a software button displayed on a screen).

Some aspects of embodiments of the present disclosure relate to performing automatic adjustments of the capture settings (e.g., auto white balance, auto exposure, and auto focus, also referred to as "3A") of the digital camera system 100 with assistance from dominant scene classification performed on the continually captured images prior to the triggering of the recording of an image. In some embodiments, the identified dominant portions of the scene are supplied as the only inputs to the processor for computing the capture settings. In some embodiments, some or all portions of the dominant scene classification are performed by the co-processor 170.

For example, the digital camera module 110 may capture a view of a scene that includes people in the foreground and in the center of the frame, where the people are standing in the shade of a building, while the background includes blue skies and a sunny lawn. Accordingly, in one embodiment of the present disclosure, dominant scene classification is automatically performed on the received images to determine that the people are the dominant class or "subject" of the image to be captured. After determining that the people are the dominant class, the processor 130 may automatically adjust the camera settings, including the white balance, the exposure, and the focus to tune the capture settings for the subject of the scene (e.g., to adjust the white balance for the cool color temperature of a subject in the shade rather than for the warm color temperature of the background, to increase the exposure by increasing the aperture or exposure time to account for the darkness of the shade, and to set the focus on the people).

Comparative image classification techniques generally fail to find the dominant scene as would be perceived by a person due to the unavailability of sufficiently large and labeled data sets for training an image classifier that can classify the wide range of subjects generally encountered by users.

Accordingly, aspects of embodiments of the present disclosure relate to systems and methods for performing automatic dominant scene classification of input images. In more detail, aspects of embodiments of the present disclosure relate to automatically analyzing input images to determine the portions or regions of the input images that correspond to the "dominant class" or the "subject" of the scene, as would typically be recognized by a person viewing the scene. Some aspects of embodiments of the present disclosure relate to the use of semantic segmentation in the process of performing dominant scene classification.

Some aspects of embodiments of the present disclosure relate to the use of weighted area ratios of each class rather than using the softmax output of a classification model. In more detail, using the class with the maximum area ratio (e.g., making up the largest part of the image) generally fails to provide what a human would typically identify as the dominant class or subject of the scene. This is because the background class, such as sky or sand or road, often has the largest area in the image. Accordingly, some embodiments of the present invent disclosure relate to one or more techniques that may be combined to identify the dominant class.

In portable devices such as smartphones and standalone digital cameras, considerations such as energy consumption and weight (e.g., battery size) can constrain the amount of computational power (e.g., clock speed of processors and number of processing cores) and memory that is available for performing dominant scene classification on images. As such, some aspects of embodiments of the present disclosure relate to reducing the complexity of the dominant class computation in order to provide a system that can run quickly enough on a mid-tier mobile processor in order to, for example, provide real-time adjustments to the capture settings. In some embodiments, the system runs at a rate of at least 10 frames per second (or at least 10 Hz). In some embodiments of the present invention, the system runs at a rate of about 14 frames per second (about 14 Hz). However, embodiments of the present invention are not limited thereto and the frame rate of a system or execution time of a dominant class computation may depend on factors including: the compute power of the underlying hardware, type of processor used, and the extent of multi-threading of the code.

Figure 2:
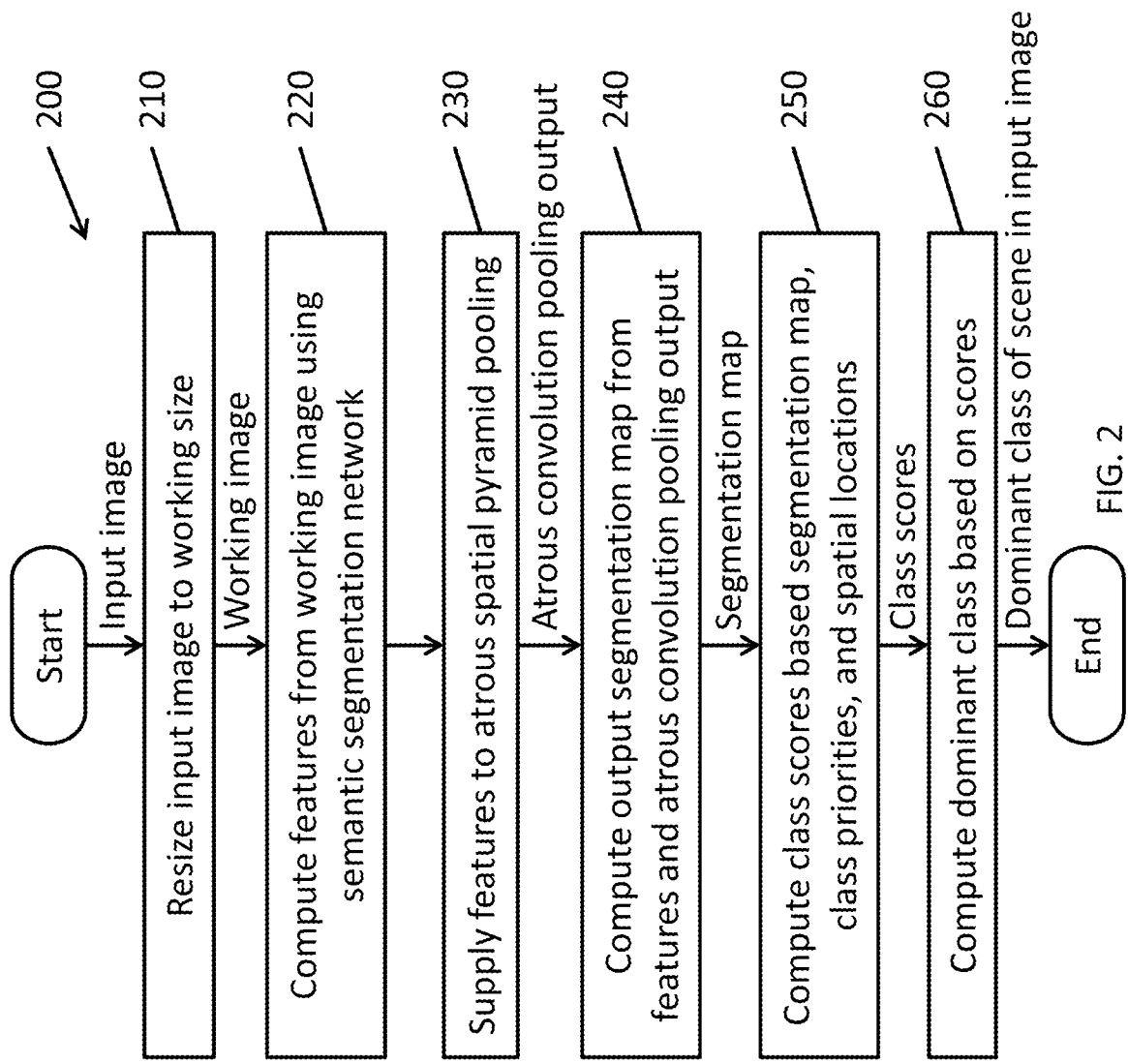
FIG. 2 is a flowchart of a method for computing a dominant class of a scene according to one embodiment.

FIG. 2 is a flowchart of a method for computing a segmentation map of a scene according to one embodiment of the present disclosure. The various operations described below with respect to the method 200 of FIG. 2 may be performed by the processor 130 and/or the co-processor 170 executing instructions (e.g., stored in the memory 150) or integrated into the circuitry of the processor 130 and/or the co-processor 170 (e.g., as programmed by a bit file in the case of a FPGA or as implemented directly in the case of an ASIC).

Figure 3:
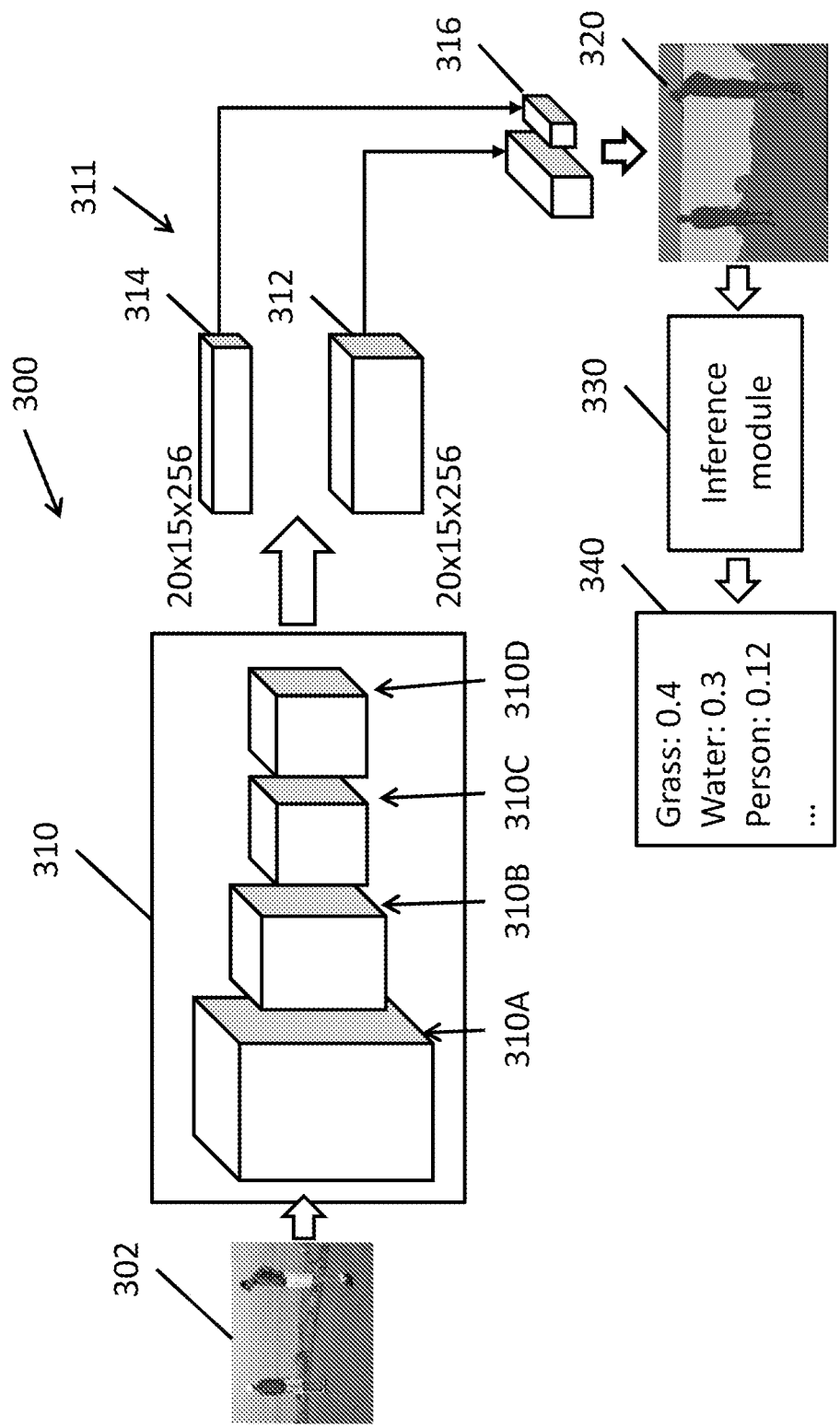
FIG. 3 is a block diagram of an architecture for dominant scene classification system of a single frame of image input according to one embodiment.

FIG. 3 is a block diagram of an architecture of a dominant scene classifier 300 configured to classify the scene depicted in a single frame of image input according to one embodiment of the present disclosure. Referring to FIG. 3, an input image 302 (e.g., captured by a digital camera module) is supplied to a convolutional neural network 310 to compute a plurality of features.

One aspect of embodiments of the present disclosure relates to the use of a low resolution image as input to the dominant scene classification system. Accordingly, images captured by the digital camera module 110 may be resized at 210 to generate a working image having a working size, in pixels, of $w_{input} \times h_{input}$. The example input image 302 shown in FIG. 3 has a size, in pixels, of 320×240. In various embodiments of the present disclosure, the dimensions $w_{input}$ and $h_{input}$ of the working image are determined by one or more factors. A first factor includes a tradeoff between computational efficiency of smaller images against higher segmentation accuracy of larger working sizes. A second factor includes an input crop size of the convolutional neural network 310, described in more detail below, where the combination of the working size and the receptive field of the convolutional neural network 310 impacts the performance of the network. A third factor includes an output size of the digital camera module 110, where the digital camera module 110 may be configured to output data in one of a variety of sizes, such that a separate resizing operation may be omitted, thereby further reducing the computational load on the processor 130 and/or the co-processor 170. Another factor is the computational hardware (e.g., the processor and/or the co-processor 170), where a match between the direct output size of the hardware and the working size of the data may reduce computational cost (for example, the working size may be chosen such that vectorized operations fall within the size of individual vector registers of the processor 130 and/or the co-processor 170). In the example embodiment shown in FIG. 3, the input image has a size of 320 pixels by 240 pixels (320×240).

At 220, a convolutional neural network 310 computes features from the working image. In some embodiments of the present disclosure, a compact network is used to perform the semantic segmentation, where the compact model is suitable for performing computation (e.g., inference) on a portable device (e.g., suitable for execution on the limited hardware typically available in portable devices).

Accordingly, in some embodiments of the present disclosure, a modified version of MobileNet V2 (See, e.g., Sandler, Mark, et al. "MobileNetV2: Inverted Residuals and Linear Bottlenecks." *Proceedings of the IEEE Conference on Computer Vision and Pattern Recognition.* 2018.) is used as a backbone to extract features from the input image (the working image). Neural network architectures similar to MobileNetV2 are designed to operate efficiently on the constraint computational resources available on mobile devices such as smartphones and tablet computers.

In some embodiments, the last three layers of the convolutional neural network 310 are replaced with atrous convolution with multiple dilation rates after each stride 2 convolution to increase the receptive field and to compute, at 230, a generated feature map with a specified output size of $w_{output} \times h_{output}$. In the particular embodiment of FIG. 3, the convolutional neural network 310 includes four layers 310A, 310B, 310C, and 310D, where layers 310B, 310C, and 310D implement atrous convolutions with various dilation rates. In one embodiment, layer 310A has a dilation rate of 1, layer 310B has a dilation rate of 2, layer 310C has a dilation rate of 4, and layer 310D has a dilation rate of 8, and where the outputs of the layers 310A, 310B, 310C, and 310D have sizes 80×60×24, 40×30×32, 20×15×96, and 20×15×320, respectively to generate an atrous convolution based global feature map 312 (e.g., of size 20×15×256). However, embodiments of the present disclosure are not limited thereto and are not limited to a particular number of layers and/or to layers having particular sizes. The output size of 20×15 (spatial dimensions) by 256 features is sixteen times smaller than the input size of 320×240.

Additional small scale features 314 are also extracted from the convolutional neural network 310 at the small convolutional layers (e.g., at the output of layer 310A, with a dilation rate of 1) the global feature map 312 and the small scale features 314 may be concatenated and a 1×1 convolution may be applied to the concatenated features to generate logits 316 (referring to a vector of raw, non-normalized predictions generated by the classification model) from the semantic segmentation network 311. See, e.g., Chen, Liang-Chieh, et al. "Rethinking Atrous Convolution for Semantic Image Segmentation." *arXiv preprint arXiv:*1706.05587 (2017). In the embodiment shown in FIG. 3, the logits 316 has a size of 20×15×155.

At 240, the dominant scene classifier computes a segmentation map 320 with size $w_{output} \times h_{output}$ from the atrous output 316. In a manner similar to that described above with respect to the working size of the working image, the output size $w_{output}$ and $h_{output}$ may also be determined by considering the computational efficiency, where the output size of MobileNet V2 is used instead of using the original image input size. In the embodiment shown in FIG. 3, the segmentation map 320 has a spatial size of 20×15. As shown in FIG. 3, the segmentation map has labeled each of the pixels along the output spatial dimensions with a corresponding class (e.g., different classes are represented by different colors or shadings corresponding to people, grass, water, and sky).

At 250, the inference module 330 uses the segmentation map 320, importance weights associated with the various classes, and the locations of objects within the image to compute class scores 340. At 260, the computed class scores are then used identify the dominant class (or "scene") in the image. In some experimental embodiments of the present disclosure, the target scene classes are flower, food, sky, grass, sand, water, tree, person, building, text, truck, motorbike, bus, car, dog and cat. However, embodiments of the present disclosure are not limited thereto and embodiments of the present disclosure may be used with larger numbers of classes and/or different sets of classes.

Figure 4:
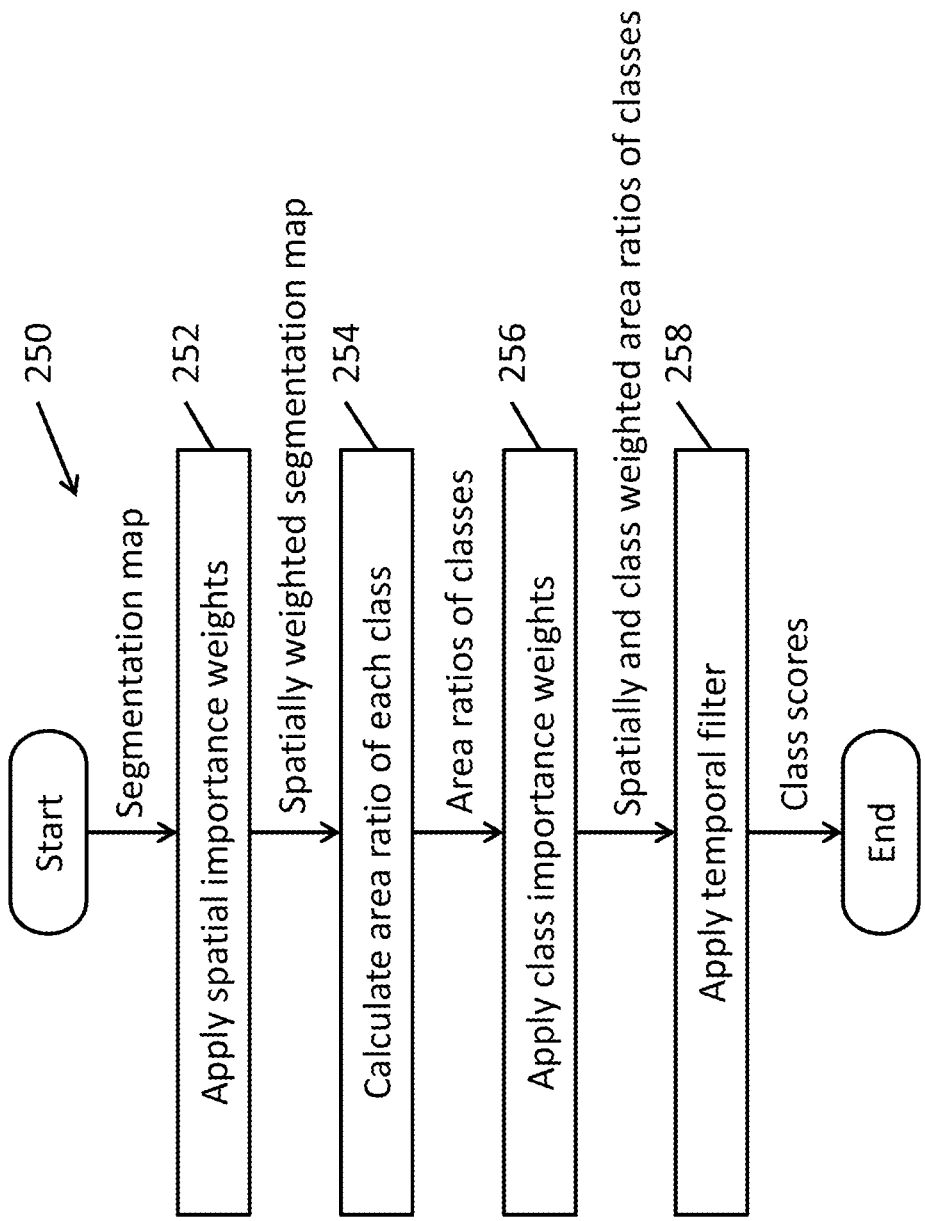
FIG. 4 is a flowchart of a method for performing inference on a segmentation map to compute class scores according to one embodiment.

FIG. 4 is a flowchart of a method 250 for performing inference on a segmentation map to compute class scores according to one embodiment of the present disclosure. Some aspects of embodiments of the present disclosure relate to using area ratios to determine a dominant class of a scene after labeling pixels with the classes identified at the output of segmentation network (the hard output of the segmentation network).

Another aspect relates to a weights assigned in accordance with class importance. For example, a person standing in front of a building will have higher importance than the building even if the area or portion of the image corresponding to the person is small compared to the area or portion of the image corresponding to the building. On the other hand, a building may have higher importance than the sky in the background if the building is in the center of the image. A third aspect relates to temporal filtering to smooth the results across frames and handle the jitter in the received camera images. In some embodiments, temporal filtering is performed on the calculated area ratios and combined with the other aspects above to compute a final modified area ratio. In such embodiments, the dominant class is the class with the maximum modified area ratio.

At 252, the inference module 330 applies spatial importance weights $s \in R^{w_{output} \times h_{output}}$ to enhance the importance of the central region of the segmentation map m 320, where the binary operator $\odot$ represents element-wise multiplication.

$$f = m \odot s$$

For example, a separate weighted map $f_c$ may be calculated for each class c of the k classes (or the classes that appear in the segmentation map) based on a separate segmentation map $m_c$ corresponding to the class c, where:

$$m_c(i, j) = \begin{cases} 1 & \text{if } m(i, j) = c \\ 0 & \text{otherwise} \end{cases}$$

The spatially weighted area ratio may then be calculated by summing over all of the values in $m_c$ (e.g., $\Sigma_{i,j} \Box m_c(i,j)$).

The spatial importance weights are set based on the importance of regions of interest in image, as derived from observed human tendencies to pay attention to particular regions of images.

The spatial weights are applied on the low resolution segmentation map 320. Each pixel is assigned a weight provided by the spatial filter s. The area of a class is the sum of all weights of the pixels in the region labeled by that class index (e.g., all pixels labeled by that class). The pixel labeled by that class index is determined by finding the class with largest soft output probability at that pixel, where the soft outputs are delivered by the network in the segmentation map 320.

Regions of interest are given importance with a spatial filters, derived as a weighted combination of multiple Gaussian filters $s_k$, k=1, 2, 3, ..., 9:

$$\mu_s = \sum_{\substack{k=1,2,3,...,9 \\ \forall x, \forall y}} w_k s_k(x, y)$$

$$s = \sum_{k=1,2,3,...,9} w_k s_k / \mu_s$$

Tuning of the mean $\mu_s$, variance, size of Gaussian filters, and the weights w used to combine the individual filters is motivated by natural human tendencies in viewing an image, sometimes referred to as the "rule of thirds" in photography. Specifically, a central Gaussian filter 510 of size w×h is added to weighted quadrant filters 520 and sideways filters 530 as shown in FIG. 5A. FIG. 5B illustrates weighted combinations of the individual filters shown in FIG. 5A, where filters 550 represent some combinations of the quadrant filters 520 and filters 560 represent combinations of the filters 550 with the sideways filters 530. FIG. 5C illustrates a resulting spatial filter 570 from combining the filters shown in FIGS. 5A and 5B and is a smooth filter that gives importance to the regions governed by the "rule of thirds," with the highest weights in the region corresponding to the middle third of the input image 302.

Figure 5D:
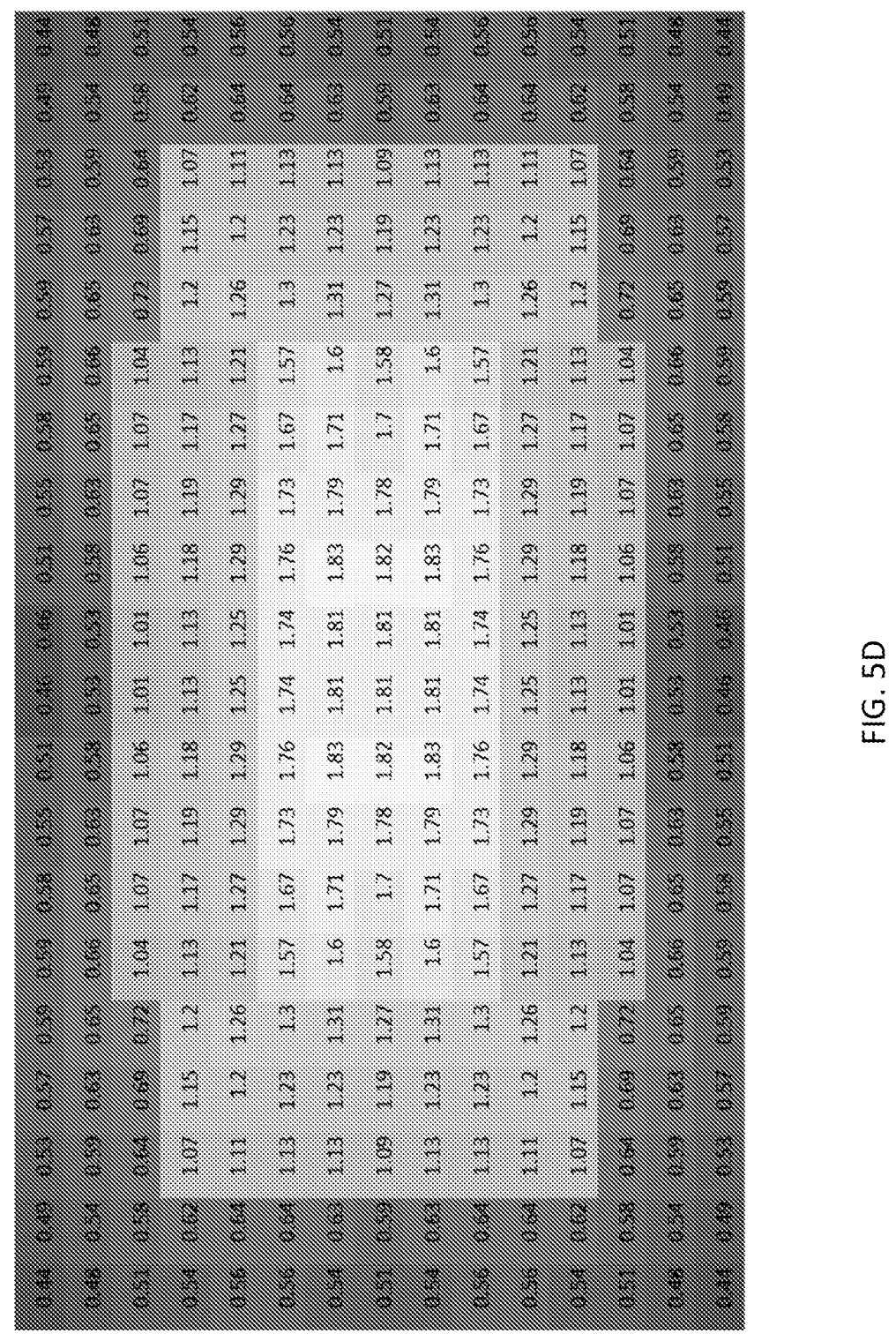

For the segmentation map of size 20×15, parameters of individual filters used are provided in Error! Reference source not found. (however, embodiments of the present disclosure are not limited thereto and may use a different mean, standard deviation and filter weight values). The weights of resulting filters are shown in FIG. 5D.

TABLE 1

Parameters of Gaussian filters constituting the spatial filter s.

| Filter type | Effective filter size | Standard deviation ($\sigma_{k,x}$, $\sigma_{k,y}$) | Filter weight $w_k$ |
|---|---|---|---|
| Quadrant filter 1-2 | 10 × 7 | (6, 6) | 1.5 |
| Quadrant filter 3-4 | 10 × 8 | (6, 6) | 1.5 |
| Sideways filter 1-2 | 10 × 8 | (6, 6) | 0.7 |
| Sideways filter 3-4 | 3 × 9 | (6, 10) | 1.0 |
| Central filter | 20 × 15 | (5, 3) | 1.0 |

In some embodiments, the applying of the spatial weights at 252 is omitted.

At 254, the inference module 330 calculates the area ratio of each class a=[$a_1$, $a_2$, ... $a_k$] based on the input to 254 (e.g., the spatially weighted segmentation map f from applying the spatial weighting or the original segmentation map 320), where k is the number of classes. In particular, the inference module may count the number of pixels of the filtered segmentation map f that are tagged with each class to determine the portion (or ratio) of the entire segmentation map that is tagged with that class. In the case where the segmentation map is spatially weighted, each area ratio is calculated based on a sum of the weighted values associated with each class at each location in the weighted segmentation map.

At 256, inference module 330 applies class importance weights w=[$w_1$, $w_2$, ... $w_k$] to enhance the importance of foreground classes (e.g., a person), and decreases the importance of background classes (e.g., sky) and to compute predictions $p_n$.

$$p_n = w \odot a$$

The class importance weights w may be previously determined or learned based on natural human behavior in determining important or favored parts of images. Specifically, some embodiments of the present disclosure were trained with target classes of flower, food, sky, grass, sand, water, tree, person, building, text, truck, motorbike, bus, car, dog and cat. However, embodiments of the present disclosure are not limited thereto and may be applied to different classes (e.g., based on the context of the intended application of the dominant scene classifier) or to different numbers of classes (e.g., more classes or fewer classes, in accordance with granularity requirements of the application and computational constraints of the system).

In some embodiments of the present disclosure, the above target classes are grouped into three levels according to their importance as shown in Table 2, then an initial weight is assigned for each group based on their relative importance (e.g., "foreground," "neutral," or "background"): a weight of 1.5 for group 1, a weight of 1.0 for group 2 and a weight of 0.5 for group 3. Finally, the weights of each specific class were tuned according to the performance in a validation dataset. The final weights for each class are also shown in Table 2.

TABLE 2

Class importance weights for targets according to one embodiment

| Group | Classes (weights) |
| --- | --- |
| Group 1 | text(2.0), person(1.5), motorbike(1.5), car(1.5), dog(1.5), cat(1.5) |
| Group 2 | flower(0.9), food(1.1), grass(1.0), sand(1.1), water(1.0), truck(1.0), bus(1.0), |
| Group 3 | sky(0.8), tree(0.8), building(0.8) |

The motivation for the above weights is that the foreground classes (Group 1) are more important than background classes (Group 3), but when two background classes appear together, one can be more important than the other. For example, when grass and sky appear together in the image, human is often more interested in the grass than the sky.

Another factor is that a scene class may be very small in spatial size in the image, but may be very important to the scene. For example, the text class has a higher weight than the others classes in the same group because high quality (e.g., in focus and high contrast) appearance of text may be of particular importance when capturing images (e.g., for optical character recognition), but may also make up a very small part of the total area of the image.

In some embodiments, the application of class weights at 256 is omitted.

At 258, in one embodiment, the dominant scene classifier 300 applies temporal filtering (e.g., a triple exponential smoothing temporal filter or a three-stage exponential filter) over the scene predictions across frames. (In some embodiments, the temporal filtering 258 is omitted.)

Figure 6:
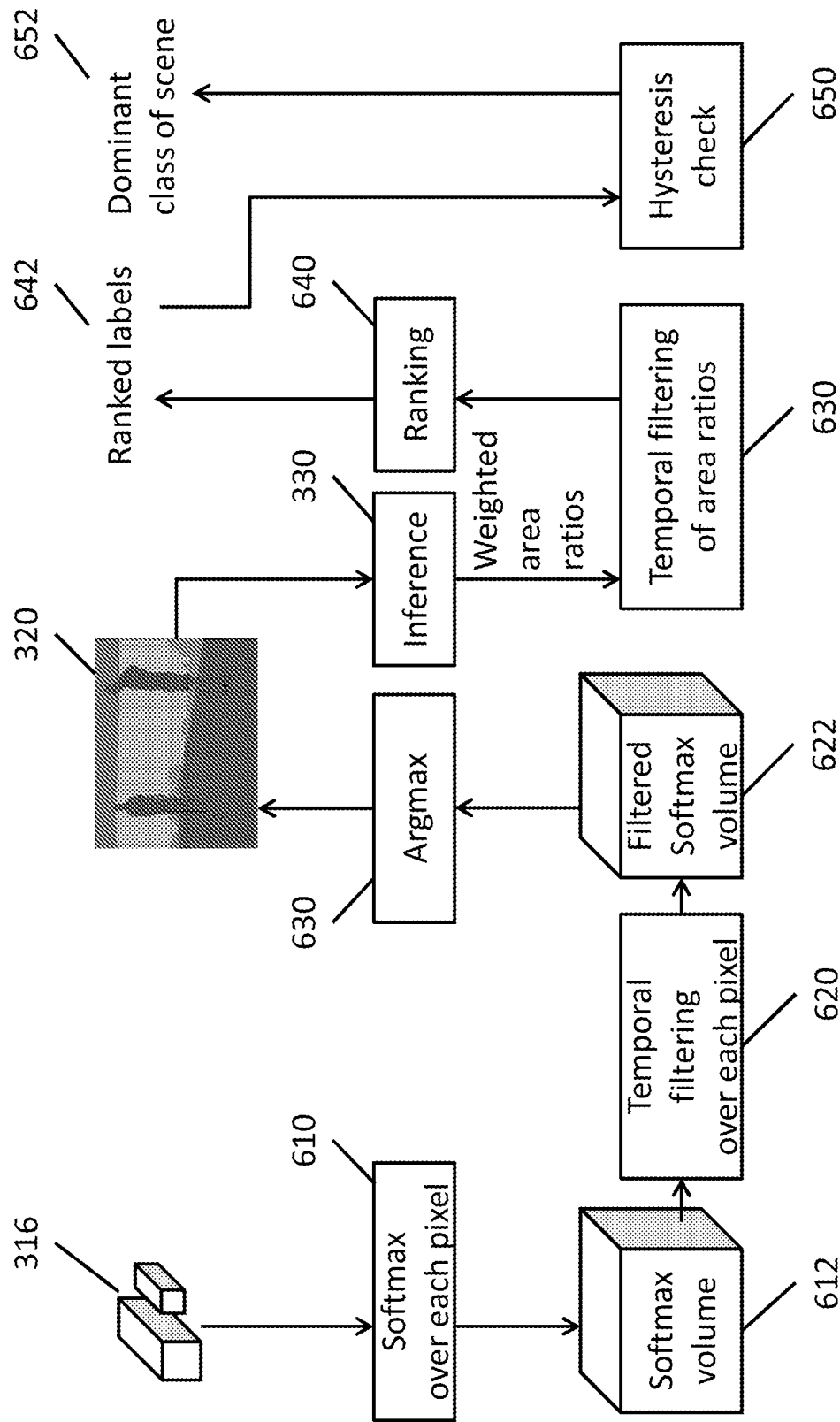
FIG. 6 is a block diagram of an architecture for a portion of the dominant scene classification system as modified to perform temporal filtering over multiple frames of image input (e.g., video input) according to one embodiment.

In more detail, FIG. 6 is a block diagram of an architecture for a portion of the dominant scene classification system 300 as modified to perform temporal filtering across multiple frames of image input (e.g., video input) according to one embodiment of the present disclosure. Like reference numerals refer to like components, as described earlier (e.g. with respect to FIG. 3) and the description of these like components will not be repeated in detail with respect to FIG. 6. As shown in FIG. 6, the logits 316 produced by the convolutional neural network 310 and the atrous spatial pyramid pooling (e.g., having dimensions 20×15×155) are normalized by applying a softmax module at 610 over each of the pixels (e.g., the 20×15 pixels across the 155 dimensions of each pixel) to compute a softmax volume 612 (e.g., of size 20×15×155). A temporal filtering module 620 is used to perform temporal filtering of over a plurality of frames (e.g., a current frame n, a previous frame n−1, and the frame before the previous frame n−2) to generate a filtered softmax volume 622 (e.g., of size 20×15×155). In one embodiment, each 3D pixel value p(i, j, k) is independently filtered using a triple-exponential smoothing filter with a filter factor of a=0.2 (however, embodiments of the present disclosure are not limited thereto and may use a different filter factor in the range of 0<α<1). In particular, for a current frame n:

$$f_{n,0}(i,j,k) = \alpha \times p_n(i,j,k) + (1-\alpha) \times f_{n-1,0}(i,j,k)$$

$$f_{n,1}(i,j,k) = \alpha \times f_{n,0}(i,j,k) + (1-\alpha) \times f_{n-1,1}(i,j,k)$$

$$f_{n,2}(i,j,k) = \alpha \times f_{n,1}(i,j,k) + (1-\alpha) \times f_{n-1,2}(i,j,k)$$

where $f_{n,2}(i, j, k)$ is the filtered softmax volume 622 that is used to compute segmentation map 320.

The filtered softmax volume 622 is supplied to an argmax module 630 to compute the highest scoring class for each pixel (e.g., each of the 20×15 pixels) to generate a segmentation map 320. The segmentation map 320 may then be supplied to an inference module 330 to compute weighted area ratios α (e.g., weighted based on spatial position and class importance) in a manner similar to that described above.

According to one embodiment, temporal filtering is performed by temporal filtering module 630. This filter allows the dominant scene classification system 300 to adapt smoothly to changes in scene in order to avoid sudden changes in scene predictions across frames, where at frame n:

$$f_{n,0} = \alpha \odot p_n + (1-\alpha) \odot f_{n-1,0}$$

$$f_{n,1} = \alpha \odot f_{n,0} + (1-\alpha) \odot f_{n-1,1}$$

$$f_{n,2} = \alpha \odot f_{n,1} + (1-\alpha) \odot f_{n-1,2}$$

In some embodiments, the inference module 330 applies exponential filtering to assign exponentially lower importance to the predictions from past frames (e.g., $f_{n-1,0}$, $f_{n-1,1}$, and $f_{n-1,2}$ above) compared to the predictions from the present frame (e.g., $p_n$, $f_{n,0}$, and $f_{n,1}$ above). All three stages use a smoothening factor of α, where 0<α<1 (e.g., α=0.4).

The temporally filtered area ratios may then be supplied to a ranking module 640 to rank the classes detected in the image (as shown in the segmentation map) based on the weighted area ratios of the classes in order to compute ranked labels 642.

Referring back to FIG. 2, at 260, the dominant scene classification system 300 selects the class with the highest score (e.g., highest filtered weighted area ratio or highest ranked label in the ranked labels) from the ranked labels 642 as the dominant class c* of the scene:

$$c^* = \operatorname{argmax}_c f_{n,2}$$

In some embodiments, the ranked labels 642 may be supplied to a hysteresis check module 650 before outputting the dominant class of the scene 652 (e.g., the highest ranked label or class in the ranked labels) at 260.

The hysteresis check module 650 may be used to reduce the number of times toggles occur in a detected scene across frames. For example, if a camera pans horizontally from a view of the ocean to a view of people, the dominant class may toggle back and forth between "water" and "person" due to various sources of noise (e.g., camera shake, movement of people, waves, or other objects in the scene, exposure adjustment noise, and the like). This may especially be the case where the top ranked and second ranked classes in the ranked labels 642 have comparable filtered area ratios. Accordingly, some embodiments of the present disclosure use hysteresis to reduce the amount of toggling between top classes.

In one embodiment, a hysteresis condition corresponds to a condition when the previously detected label is now the second ranked label in the ranked labels 642 and the difference in confidence (or score) of the first and second ranked labels of the ranked labels 642 is less than a hysteresis threshold level. If the hysteresis condition is met, then the previously detected label is maintained as the current detected label and the detected label confidence is set to the confidence of the second highest ranked label (e.g., the current detected label). However, if the above conditions are not met, then the current detected label is set to the highest ranked label of the ranked labels 642 and the detected label confidence is set to the confidence of the highest of the ranked labels 642. In other words, the confidence or score of a current detected output scene may fall below the score of another class, but the dominant scene classifier 300 will maintain the same output class until the confidence of a new class is higher than the confidence of the current class by a threshold amount.

Qualitatively, the temporal filtering provides more predictable and stable output from the dominant scene classifier. Generally, the first exponential filter $f_{n,0}$ smooths the first order variations in predictions $p_n$ that may result from user hand movements (e.g., camera shake), slight changes in positioning of object of interest, and the like. The second exponential filter $f_{n,1}$ addresses trends in scene variation over time, such as the user tilting the camera (e.g., rotating along a vertical plane) from trees upward toward sky. In this example, second stage of exponential filtering causes the detected scene to changes from "tree" to "sky" smoothly without fluctuations (e.g., bouncing between "tree" and "sky") during the transition. The third exponential filter stage $f_{n,2}$ handles sudden changes in scene, for example, if a dog bounded into the scene and in front of the camera. Due to third stage of exponential filtering, embodiments of the present disclosure will identify the dog as a part of the scene only upon sustained appearance of the dog over multiple frames. While the temporal filtering is described above in the context of a triple exponential soothing filter or a three-stage exponential filter, embodiments of the present disclosure are not limited thereto and may be implemented with fewer than three stages (e.g., one or two stages) or with more than three stages.

Some aspects of embodiments of the present disclosure also relate to a confidence-based inference method that uses the soft output of the classifier (e.g., the confidence score or the probability of this pixel being classified as any one of the classes of interest). In some embodiments, further adjustment of the soft scores is performed, such as thresholding to reduce or prevent noisy output or scaling to boost particular classes. The adjustments may be used to control a tradeoff between the precision and recall of the classification system.

Figure 7:
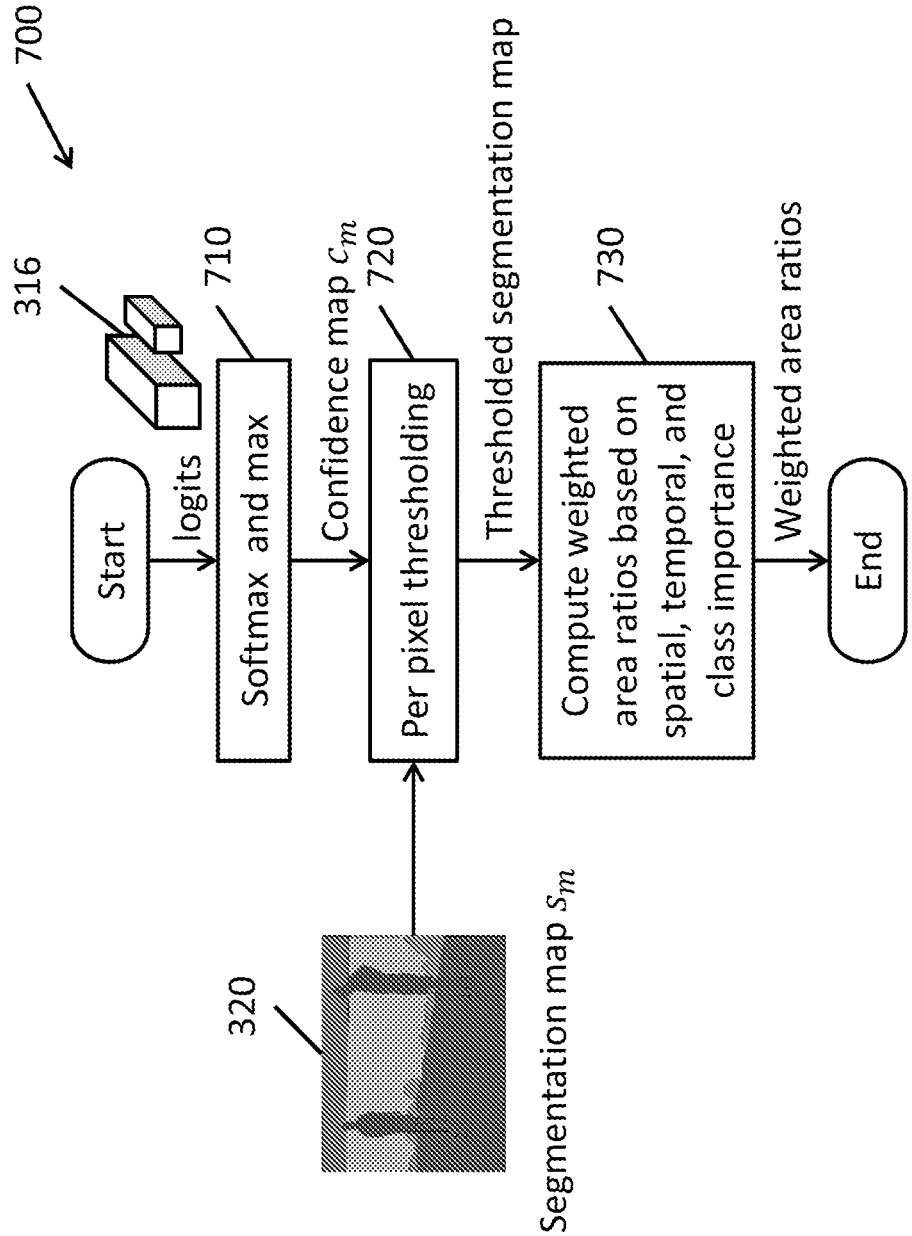
FIG. 7 is a flowchart of a method for applying the soft output of the classifier according to one embodiment.

FIG. 7 is a flowchart of a method for applying the soft output of the classifier according to one embodiment of the present disclosure. As shown in FIG. 7, at 710, the semantic logits 316 from the semantic segmentation network 311 are normalized first with softmax. Each channel of the output of the softmax module represents the softmax probabilities of the scene classes for that pixel (e.g., the 155 channels of the 20×15×155 logits of FIG. 7). At 710, a maximum value of each pixel is taken along the channel dimension, which is output as a confidence map. Accordingly, two maps are obtained after semantic segmentation: one is the segmentation map 320 $s_m \in R^{W_{output} \times h_{output}}$ (e.g., having dimensions 20×15) where each element or pixel is assigned a class index from among the k classes (e.g., an integer from $\{1, 2, \ldots, k\}$); and another map is the confidence map $c_m \in R^{W_{output} \times h_{output}}$ where each element is the softmax score of the corresponding class in $s_m$.

At 720, the dominant scene classifier 300 applies per class thresholds $[t_1, t_2, \ldots t_k]$ to each element of the segmentation map $s_m$, to obtain a thresholded segmentation map $s'_m$ in accordance with the confidence map:

$$s'_m = \begin{cases} s_m[i,j], & \text{if } c_m[i,j] \geq t_c \text{ and } s_m[i,j] = c \\ 0, & \text{if } c_m[i,j] < t_c \text{ and } s_m[i,j] = c \end{cases}$$

Qualitatively, each location or pixel of the thresholded segmentation map $s'_m$ has the class value c of the segmentation map $s_m$ when the confidence value of that classification (as read from the corresponding location in the confidence map $c_m$) is greater than a threshold $t_c$ for that class c.

In some embodiments of the present disclosure, class importance is also applied when computing the thresholded segmentation map, giving more weight to important classes (e.g., in accordance the class importance weights described above), and a maximum is taken per pixel of the thresholded segmentation map $s'_m$ to determine the pixel label for each class.

At 730, the thresholded segmentation map $s'_m$ is supplied to the inference module, as described above, for modification and calculation of class scores using Spatial, Temporal and Class Importance based Inference to $s'_m$.

Some aspects of embodiments of the present disclosure relate to training the dominant scene classifier 300 using a two-headed model that includes the segmentation head described above and a separate classification head. In some embodiments, the classification head plays the role of regularization during the training process and the segmentation head is used for scene classification, where, as described above, the class with largest area ratio is regarded as the dominant scene. The segmentation head acts as a local scene detector to detect each object or material spatially in the scene, whereas the classification head attempts to provide a global class for the scene, as would be perceived by a human or as appropriate for a trained application (e.g., for performing the automatic white balance, exposure, and focus ("3A") and/or other image signal processing algorithms).

Figure 8:
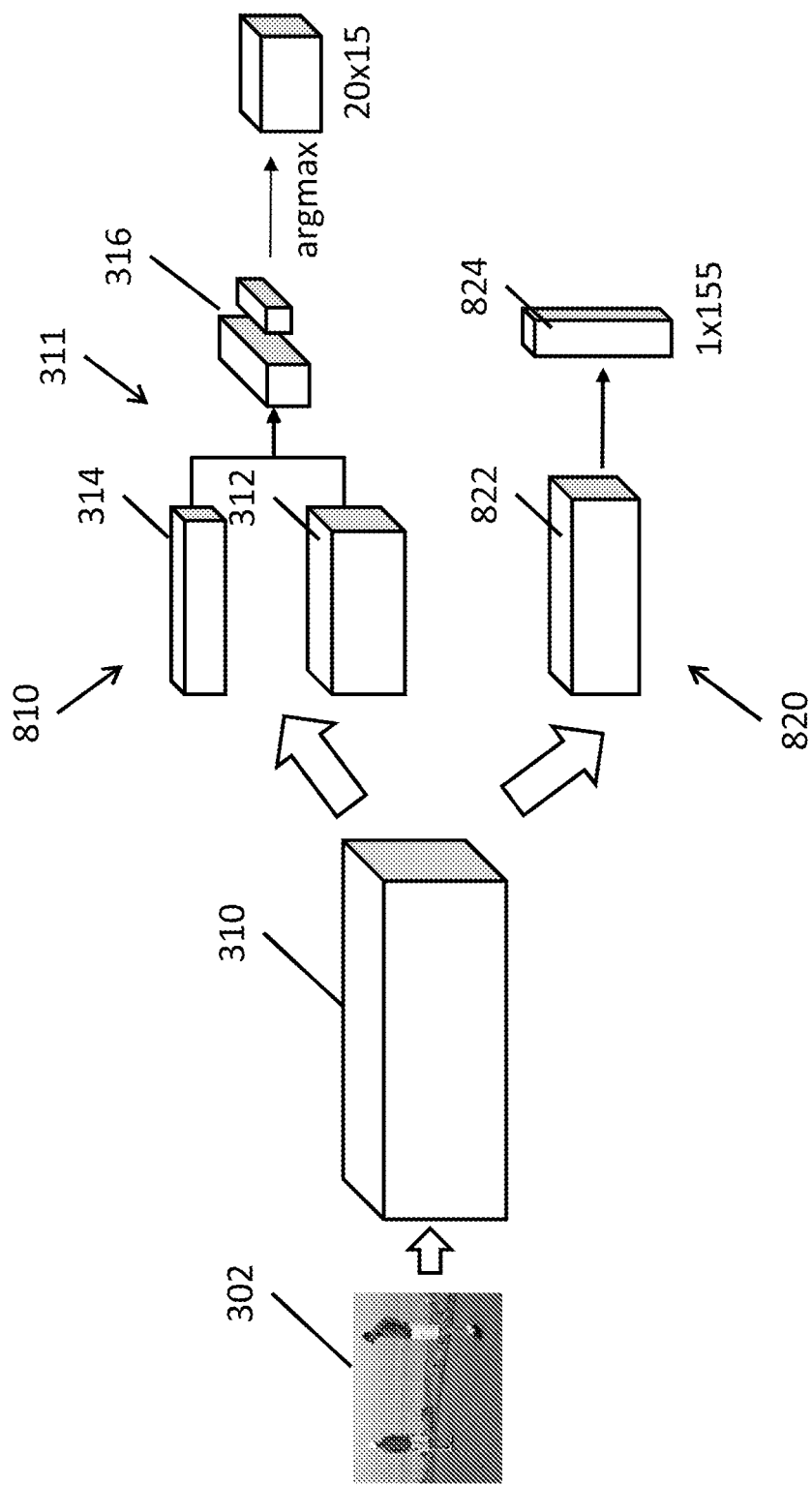
FIG. 8 is a block diagram of a dominant scene classification system according to one embodiment that further includes a classification head configured to receive the output of the convolutional neural network.

FIG. 8 is a block diagram of a dominant scene classification system according to one embodiment of the present disclosure that further includes a classification head configured to receive the output of the convolutional neural network 310. As shown in FIG. 8, the input image 302 is supplied to the convolutional neural network 310, as described above with respect to FIG. 3, and the output of the convolutional neural network is supplied to a segmentation head 810 including atrous spatial pyramid pooling as described above, to compute a classification label vector from the segmentation map, where each element in the classification label vector corresponds to the area ratio of each class calculated from the segmentation map.

The dominant scene classification system shown in FIG. 8 further includes a classification head 820 which includes one or more blocks 822 configured to compute a vector of global logits 824 for the image 302. In some embodiments, the one or more blocks 822 include one additional residual block, one global average pooling block, and one 1×1 convolution block with the channel size as the number of classes.

In one embodiment, when using the two headed model shown in FIG. 8 for training a dominant scene classification system, the loss function for the training is a weighted sum of the segmentation loss and the classification loss. However, during inference (e.g., deployment of the model) only the segmentation head is used, as the classification head is merely used for providing regularization loss during training.

Figure 9:
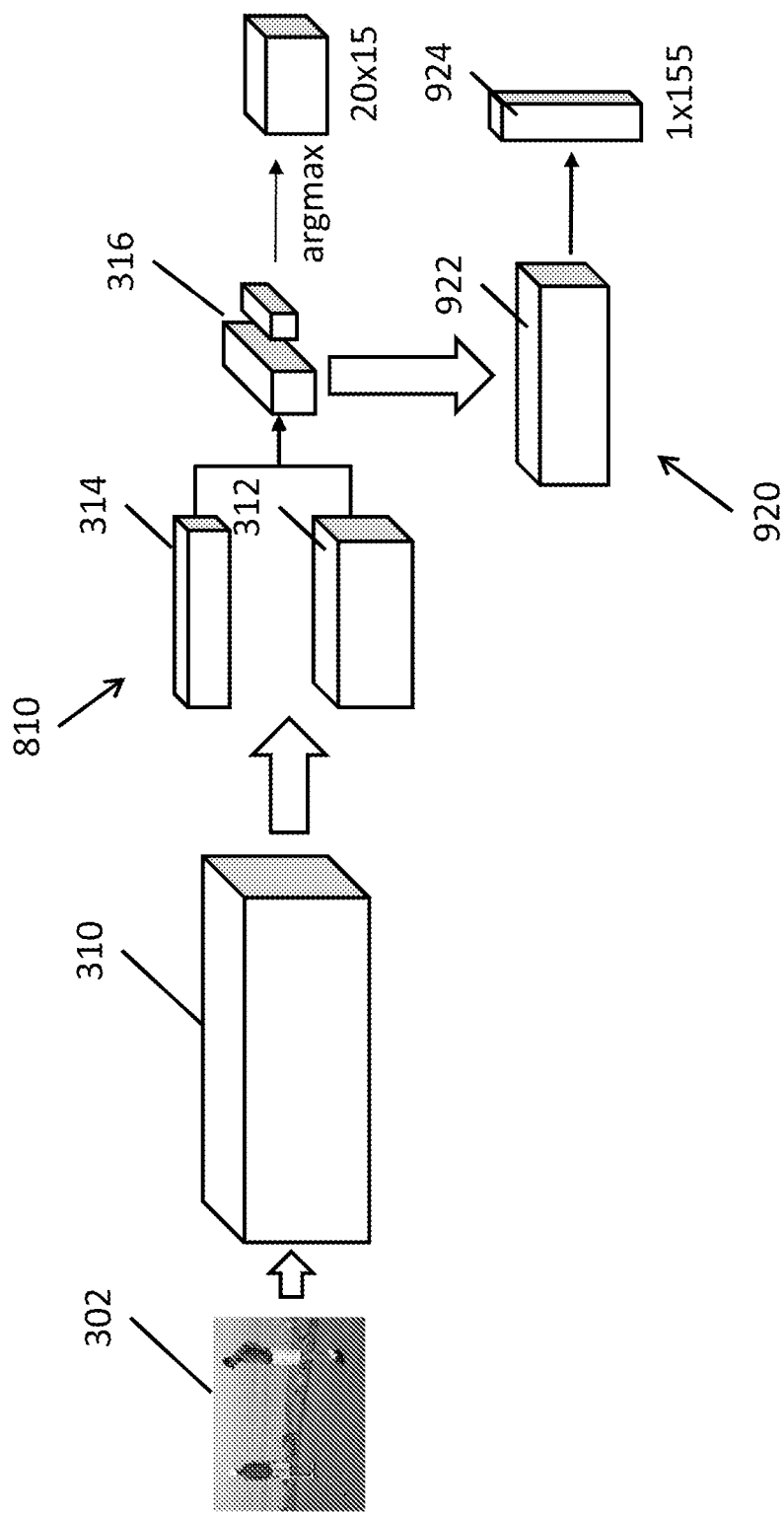
FIG. 9 is a block diagram of a dominant scene classification system according to one embodiment.

FIG. 9 is a block diagram of a dominant scene classification system according to one embodiment of the present disclosure that further includes a classification head 920 configured to receive the output of the semantic segmentation network 311. The two-headed model of FIG. 9 is substantially similar to that of FIG. 8, but uses the logits 316 from the semantic segmentation network 311 as input to blocks 922 of the classification head 920 to compute a vector of global logits 924 (rather than the output of the convolutional neural network 310 in the embodiment shown in FIG. 8).

Comparative techniques for semantic segmentation generally require complex pixel-wise labeling and the lack of large labelled datasets generally makes such pixel-wise labeling difficult or impossible. Accordingly, some aspects of embodiments of the present disclosure also relate to a method to merge datasets with different class labels in a semi-automatic way. In particular, some aspects of embodiments of the present disclosure relate to a bounding box based pixel labeling method. Such a bounding box based approach significantly improves the performance of detecting particular classes such as a text class (e.g., printed text in an image).

As one example, in one embodiment of the present disclosure, data for the sixteen target classes of: "flower," "food," "sky," "grass," "water," "tree," "person," "building," "truck," "motorbike," "bus," "car," "dog," "cat," "sand," "text," and "none" were collected and compiled from different training data sets. For example, training data (e.g., images) corresponding to most of the above classes were collected from the ADE20k dataset (see, e.g., Scene Parsing through ADE20K Dataset. Bolei Zhou, Hang Zhao, Xavier Puig, Sanja Fidler, Adela Barriuso and Antonio Torralba. Computer Vision and Pattern Recognition (CVPR), 2017.) and the MSCOCO Stuff dataset (see, e.g., Lin, Tsung-Yi, et al. "Microsoft coco: Common objects in context." *European conference on computer vision*. Springer, Cham, 2014.), and manual labeling.

The ADE20k data set included 150 classes and a "none" class. The MSCOCO Stuff image data set includes 150 similar labels and further includes classes for "text," "dog," "cat," "snow," and "none," for a total of 155 classes.

Figure 10B:
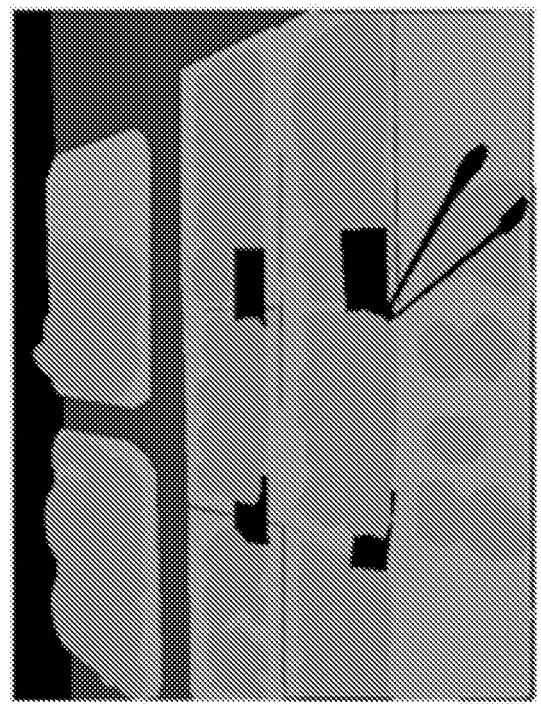
FIG. 10B is an example of a label map corresponding to image of FIG. 10A, where the image is semantically segmented based on the different classes of objects shown in FIG. 10A and each region is labeled with its corresponding class according to one embodiment.
Figure 10A:
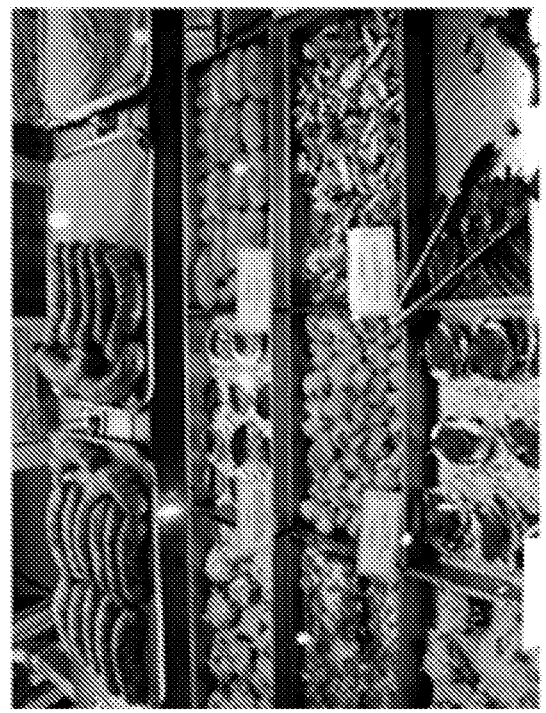
FIG. 10A is an example of an image from the training data set (an image of a display case of food)

To output only the target number of classes (e.g., sixteen classes), the subclasses from the 155 classes are merged. For example, the "water" class is merged from the separate classes "water," "sea," "river," "lake," "swimming pool," and "waterfall." As another example, the "tree" class was merged from the data labeled with the "tree" and "palm tree" classes, and the "building" class was merged from the "building" and "skyscraper" classes. FIG. 10A is an example of an image from the training data set (an image of a display case of food), FIG. 10B is an example of a label map corresponding to image of FIG. 10A, where the image is semantically segmented based on the different classes of objects shown in FIG. 10A and each region is labeled with its corresponding class.

However, in this example, data for the text class was collected from different data sets, including the Chinese Text in the Wild dataset (see, e.g., Yuan, Tai-Ling, et al. "Chinese text in the wild." *arXiv preprint arXiv:*1803.00085 (2018).), the MSCOCO Text dataset, the KAIST Text dataset (see, e.g., Jehyun Jung, SeongHun Lee, Min Su Cho, and Jin Hyung Kim, "Touch TT: Scene Text Extractor Using Touch Screen Interface", ETRI Journal 2011), the ICDAR 2015 dataset (see, e.g., D. Karatzas, L. Gomez-Bigorda, A. Nicolaou, S. Ghosh, A. Bagdanov, M. Iwamura, J. Matas, L. Neumann, V. R. Chandrasekhar, S. Lu, and F. Shafait, "ICDAR 2015 competition on robust reading. In Document Analysis and Recognition (ICDAR), 2015 13th International Conference on (pp. 1156-1160). IEEE), and ImageNet (see, e.g., J. Deng, W. Dong, R. Socher, L.-J. Li, K. Li and L. Fei-Fei, ImageNet: A Large-Scale Hierarchical Image Database. *IEEE Computer Vision and Pattern Recognition (CVPR)*, 2009.).

Figures 11A, 11B:
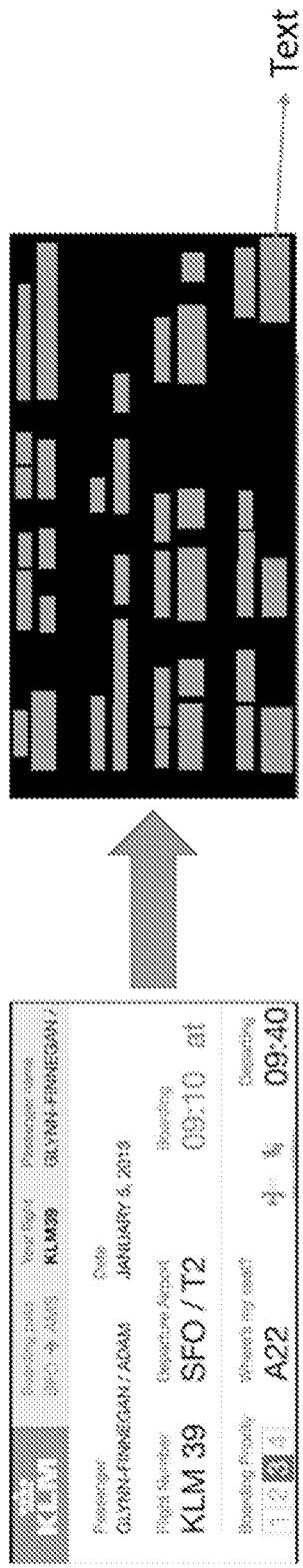
FIG. 11A is an example of an input image including text and FIG. 11B is a segmentation map showing portions of the image corresponding to text bounding boxes in gray according to one embodiment.

In some circumstances, training with the whole bounding box labeled as the text region results in better performance than pixel level text character labeling. As such, in some embodiments of the present disclosure, the bounding box provided by the KAIST Text dataset is used rather than the per pixel text character labeling. If the bounding box is provided by the dataset, such as for Chinese Text in the wild dataset, the supplied bounding box was used and each pixel inside the bounding box was assigned as being part of the text class (rather than only the pixels that corresponded to the letterforms of the text). If the text bounding box is not provided by the dataset, such as some text images collected from ImageNet, some aspects of embodiments of the present disclosure use a pre-trained text detector to obtain the text bounding box in the text image. In one such embodiment, the EAST text detector (see, e.g., Zhou, Xinyu, et al. "EAST: an efficient and accurate scene text detector." *Proceedings of the IEEE conference on Computer Vision and Pattern Recognition.* 2017.) with ResNet 101 (see, e.g., He, Kaiming, et al. "Deep residual learning for image recognition." *Proceedings of the IEEE conference on computer vision and pattern recognition.* 2016.) as backbone pre-trained on the ICDAR 2013 and ICDAR 2015 datasets, is applied to extract the bounding box of text in the training data. FIG. 11A is an example of an input image including text and FIG. 11B is a segmentation map showing portions of the image corresponding to text bounding boxes in gray. The remaining part of the image, in black, is assigned the "none" class.

Some aspects of embodiments of the present disclosure also relate to tailoring the dominant scene classification system to detect subclasses of objects. For example, performing 3A adjustment sometimes requires determining the color of an object, especially water, which may appear as a variety of different colors based on the conditions (e.g., blue, gray, green, etc.). In the particular example of the water class, water may be divided into four subclasses: "blue water," "green water," "low saturation water" (e.g., gray), and "other water." To distinguish between the different subclasses, the segmentation map 320 may be used to identify portions of the scene labeled with the parent class of "water." Portions of the input image 302 that were classified as corresponding to "water" are then transformed into hue, saturation, and value (HSV) color space (e.g., from an input red, blue, green (RGB) color space). Accordingly, each pixel in the region labeled "water" may be classified based on Table 3:

TABLE 3

| Condition | Water color subclass |
|---|---|
| Saturation value less than 12 | "low saturation water" |
| Hue value between 67 and 150 | "green water" |
| Hue value between 151 and 255 | "blue water" |
| Otherwise | "other water" |

After classifying each of the pixels in the "water" region, majority voting may be applied across all of the sub-classed pixels to identify a subclass for the entire region.

Accordingly, some aspects of embodiments of the present disclosure relate to sub-classing based on the color of the pixels in the source image.

As such, aspects of embodiments of the present disclosure relate to computing the dominant class of a scene as imaged by a camera system. While the present disclosure has been described in connection with certain exemplary embodiments, it is to be understood that the disclosure is not limited to the disclosed embodiments, but, on the contrary, is intended to cover various modifications and equivalent arrangements included within the scope of the appended claims, and equivalents thereof.

What is claimed is:

1. A method for computing a dominant class of a scene, comprising:
    receiving a sequence of images of a scene;
    computing a softmax over each pixel of an input image of the sequence of images of the scene;
    performing temporal filtering over each pixel of the input image using the sequence of images to compute a filtered softmax volume;
    using the filtered softmax volume, determining a highest scoring class for each pixel of a particular image;
    based on the highest scoring class for each pixel of the particular image, generating a segmentation map; and
    outputting a detected dominant class of the scene based on the segmentation map.

2. The method of claim 1, further comprising determining the detected dominant class based on a highest ranked label of a plurality of area ratios computed based on the segmentation map, each of the area ratios corresponding to a different class of a plurality of classes of the segmentation map.

3. The method of claim 2, wherein the computing the area ratios further comprises:
    spatially weighting the segmentation map by multiplying each location of the segmentation map by a corresponding one of a plurality of spatial importance weights; and
    summing the spatially weighted segmentation map to compute a spatially weighted area ratio for each of the classes,
    wherein the spatial importance weights are a weighted combination of Gaussian filters having highest weight in a region corresponding to a middle third of the input image.

4. The method of claim 2, wherein the computing the area ratios further comprises class weighting the area ratios by multiplying the area ratio for each class by a corresponding class importance weight of a plurality of class importance weights, and
    wherein the plurality of class importance weights comprise a foreground group of classes having higher weights than a background group of classes.

5. The method of claim 1, further comprising using atrous spatial pyramid pooling at an output of a plurality of atrous convolutional layers, and
    wherein the segmentation map is computed based on an output of the atrous spatial pyramid pooling.

6. The method of claim 1, wherein the input image is the last image of the sequence of input images, and
    wherein the method further comprises:
    computing a maximum across the filtered softmax volume to compute the segmentation map.

7. The method of claim 1, wherein the temporal filtering is performed with a triple-exponential smoothing filter.

8. The method of claim 1, further comprising:
    generating a sequence of weighted area ratios for a sequence of segmentation maps computed from the sequence of input images; and
    performing temporal filtering over the sequence of weighted area ratios,
    generating a plurality of ranked labels is computed based on the sequence of weighted area ratios,
    wherein the detected dominant class is determined based on the plurality of ranked labels.

9. The method of claim 8, wherein the detected dominant class is selected by:
    evaluating a hysteresis condition that is met when a previously detected dominant class is a second highest ranked label of the plurality of ranked labels and when a difference in weighted area ratio between a highest ranked label and the second highest ranked label is less than a threshold;
    in response to determining that the hysteresis condition is met, maintaining the previously detected dominant class as the dominant class; and
    in response to determining that the hysteresis condition is not met, setting the highest ranked label as the detected dominant class.

10. The method of claim 1, wherein each pixel of the segmentation map is associated with one or more corresponding confidence values, each of the one or more corresponding confidence values corresponding to a different one of a plurality of classes, and
    wherein the method further comprises thresholding the segmentation map by selecting values from locations of the segmentation map where corresponding locations of the confidence map exceed a threshold corresponding to a class of the location of the segmentation map.

11. The method of claim 10, wherein the segmentation map is computed from a plurality of logits output by a convolutional neural network, the logits comprising spatial dimensions and a feature dimension, and
    wherein the one or more confidence values form a confidence map generated by:
    computing a softmax along the feature dimension of the logits; and
    computing a maximum of the softmax along the feature dimension of the logits to compute the confidence values corresponding to each location of the confidence map.

12. The method of claim 1, wherein the segmentation map is generated by a convolutional neural network comprising a global classification head configured to compute a global classification of a class of the input image, and
    wherein the convolutional neural network is trained with a loss function comprising a weighted sum of:
    a first loss associated with the detected dominant class; and a second loss associated with the global classification computed by the global classification head.

13. The method of claim 12, wherein the global classification head is configured to receive input from an output of the convolutional neural network.

14. The method of claim 12, further comprising atrous spatial pyramid pooling at an output of a plurality of atrous convolutional layers,
wherein the segmentation map is computed based on an output of the atrous spatial pyramid pooling, and
wherein the global classification head is configured to receive input from the output of the atrous spatial pyramid pooling.

15. The method of claim 1, wherein the segmentation map is generated using a convolutional neural network trained to recognize a text class of a plurality of classes with training data comprising images of text and corresponding labels, and
wherein the corresponding labels comprise bounding boxes surrounding text.

16. The method of claim 1, wherein regions of the segmentation map are labeled with a plurality of corresponding classes of a plurality of classes,
wherein a class of a plurality of classes comprises a plurality of subclasses, and
wherein the method further comprises assigning a subclass to a region in the segmentation map corresponding to the class by:
detecting a color of each of a plurality of pixels of the input image in the region corresponding to the class;
assigning one of the plurality of subclasses to each of the pixels based on the color of the pixel; and
assigning the subclass to the region based on majority voting among the subclasses assigned to the pixels of the region.

17. The method of claim 1, further comprising:
identifying a portion of the input image of the scene corresponding to the detected dominant class; and
configuring camera settings of a digital camera in accordance with the identified portion of the input image of the scene.

18. A system comprising:
a processor; and
memory storing instructions that, when executed by the processor, cause the processor to compute a dominant class of a scene by:
receiving a sequence of images of a scene;
computing a softmax over each pixel of an input image of the sequence of images of the scene;
performing temporal filtering over each pixel of the input image using the sequence of images to compute a filtered softmax volume;
using the filtered softmax volume, determining a highest scoring class for each pixel of a particular image;
based on the highest scoring class for each pixel of the particular image, generating a segmentation map of the input image; and
outputting a detected dominant class of the scene based on the segmentation map.

19. The system of claim 18, wherein the memory further stores instructions for computing a plurality of area ratios corresponding to different classes of a plurality of classes of the segmentation map, by:
spatially weighting the segmentation map by multiplying each location of the segmentation map by a corresponding one of a plurality of spatial importance weights; and
summing the spatially weighted segmentation map to compute a spatially weighted area ratio for each of the classes,
wherein the spatial importance weights are a weighted combination of Gaussian filters having highest weight in a region corresponding to a middle third of the input image, and
wherein the detected dominant class of the scene is determined based on the area ratios.

20. The system of claim 19, wherein the memory further stores instructions for computing the area ratios by class weighting the area ratios by multiplying the area ratio for each class by a corresponding class importance weight of a plurality of class importance weights, and
wherein the plurality of class importance weights comprise a foreground group of classes having higher weights than a background group of classes.

21. The system of claim 18, wherein each pixel of the segmentation map is associated with one or more corresponding confidence values, each of the one or more corresponding confidence values corresponding to a different one of a plurality of classes, and
wherein the memory further stores instructions for thresholding the segmentation map by selecting values from locations of the segmentation map where corresponding locations of the confidence map exceed a threshold corresponding to a class of the location of the segmentation map.

22. The system of claim 18, further comprising a digital camera, wherein the memory further stores instructions that, when executed by the processor, cause the processor to:
identify a portion of the input image of the scene corresponding to the detected dominant class; and
configure camera settings of the digital camera in accordance with the identified portion of the input image of the scene.

* * * * *